(12) United States Patent
Tilly et al.

(10) Patent No.: US 8,346,653 B2
(45) Date of Patent: Jan. 1, 2013

(54) AUTOMATED TRADING SYSTEM FOR ROUTING AND MATCHING ORDERS

(75) Inventors: Edward T. Tilly, Barrington, IL (US); Anthony Montesano, Chicago, IL (US); Eileen C. Smith, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 332 days.

(21) Appl. No.: 12/605,127

(22) Filed: Oct. 23, 2009

(65) Prior Publication Data

US 2010/0191640 A1     Jul. 29, 2010

Related U.S. Application Data

(63) Continuation-in-part of application No. 11/321,065, filed on Dec. 29, 2005, now Pat. No. 7,653,588, which is a continuation-in-part of application No. 10/423,201, filed on Apr. 24, 2003, now Pat. No. 7,613,650.

(60) Provisional application No. 61/107,861, filed on Oct. 23, 2008.

(51) Int. Cl.
*G06Q 40/00* (2012.01)
(52) U.S. Cl. ........................................................ 705/37
(58) Field of Classification Search .................. None
See application file for complete search history.

(56) References Cited

U.S. PATENT DOCUMENTS

| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,903,201 A | 2/1990 | Wagner |
| 4,980,826 A | 12/1990 | Wagner |
| 5,038,284 A | 8/1991 | Kramer |
| 5,101,353 A | 3/1992 | Lupien et al. |
| 5,136,501 A | 8/1992 | Silverman et al. |

(Continued)

FOREIGN PATENT DOCUMENTS

EP            0 752 135            2/1999
(Continued)

OTHER PUBLICATIONS

Evans et al. "The Effects of Electronic Trading System on Open-outcry Commodity Exchange", Social Science 410, Nov. 1998.

(Continued)

*Primary Examiner* — Jason M Borlinghaus
(74) *Attorney, Agent, or Firm* — Brinks Hofer Gilson & Lione

(57) ABSTRACT

An automated system for matching orders from a virtual trading crowd in an exchange configured for trading securities or derivatives is disclosed including an electronic trade engine operative to receive an order or a quote for a security or derivative at the exchange, the trade engine further operative to disseminate a request for a price message to a plurality of market makers quoting a class in response to receiving the order or the quote, an electronic book in communication with the electronic trade engine, the electronic book operative to store at least one order or quote received by the electronic trade engine, a database including an allocation algorithm, the database in communication with the electronic trade engine, and a trade processor in communication with the database, the trade processor operative to analyze and execute orders or quotes according to the allocation algorithm selected from the database.

20 Claims, 3 Drawing Sheets

U.S. PATENT DOCUMENTS

| | | |
|---|---|---|
| 5,297,031 A | 3/1994 | Gutterman et al. |
| 5,297,032 A | 3/1994 | Trojan et al. |
| 5,305,200 A | 4/1994 | Hartheimer et al. |
| 5,315,634 A | 5/1994 | Tanaka et al. |
| 5,375,055 A | 12/1994 | Togher et al. |
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Spepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Gary |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,236,953 B1 | 6/2007 | Cooper et al. |
| 7,246,093 B1 * | 7/2007 | Katz ............................. 705/37 |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 * | 9/2002 | Melkomian et al. ............ 705/37 |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0177085 A1 | 9/2003 | Buckwalter et al. |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0024689 A1 * | 2/2004 | Zhou et al. ..................... 705/37 |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 | 5/2005 | Kavanaugh |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |

| | | | |
|---|---|---|---|
| 2007/0112659 | A1 | 5/2007 | Shalen et al. |
| 2007/0172352 | A1 | 7/2007 | Chiang |
| 2007/0282758 | A1 | 12/2007 | Vischer et al. |
| 2008/0059356 | A1 | 3/2008 | Brodsky et al. |
| 2008/0065560 | A1 | 3/2008 | Bloom |
| 2008/0120249 | A1 | 5/2008 | Hiatt |
| 2008/0120250 | A1 | 5/2008 | Hiatt, Jr. |
| 2008/0154790 | A1 | 6/2008 | Hiatt |
| 2008/0183640 | A1 | 7/2008 | Shalen |
| 2008/0243676 | A1 | 10/2008 | Smith |
| 2009/0204534 | A1 | 8/2009 | Tilly et al. |

FOREIGN PATENT DOCUMENTS

| | | |
|---|---|---|
| EP | 0 952 536 A1 | 10/1999 |
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, no date, 2002 (15 pages).

C. Danis, et al. "Alternatives to an Open Outcry Market: An Issue of Supporting Cooperation in a Competitive Situation", IBM TJ Watson Research Center, USA, Apr. 24, 2003 (20 pages).

Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.

"Squeezing the poor", *Guardian*, p. 8, Feb. 11, 1997.

"La libre competencia sacude a las electricas", *Actualidad Economica*, p. 18, Sep. 30, 1996.

Souter, Gavin, "Bermuda's reinsurers eager to please", *Business Insurance*, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html, Publicly available Apr. 24, 2003 (8 pages).

"Self-Regulatory Organizations; Notice of Filing of Proposed Rule Change and Amendment No. 1 Thereto by the Pacific Exchange, Inc. Relating to the Exchange's New Trading Platform for Options, PCX Plus", 67 Fed. Reg. 69,580-69,592 (Nov. 18, 2002).

E. Clemons et al., "Information Technology and Screen-Based Securities Trading: Pricing the Stock and Pricing the Trade", *Management Science*, vol. 43, No. 12, Dec. 1997.

"The Pandora's Box over autoquotes; Industry Trend or Event", *Wall Street & Technology*, Section No. 3, vol. 13, p. 38; ISSN: 1060-989X, Mar. 1997.

"How is a Trade Executed—Limit Order", *Nasdaq*, dated Mar. 7, 2000, One Page.

S. Cosgrove, "Courting Retail, Institutional Customers, CBOE, AMEX Get Creative", *Knight-Ridder Financial News*, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report on the Operation of the Cincinnati Stock Exchange National Securities Trading System, U.S. Securities and Exchanges Commission, May 1981.

A Report on the Operation of the Cincinnati Stock Exchange National Securities Trading System 1978-1981, U.S. Securities and Exchange Commission, Sep. 1982.

CBOT Press Release Entitled "Impressive Project A® Provides Extended Opportunity in CBOT Financial Complex", dated Jan. 1995, printed from the Internet at http://web.archive.org/web/19990429192354/finance/wat.ch/SCFOA/bulletin/_0001960.htm on Oct. 31, 2005, 3 pages.

A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).

A. Frino et al., The Liquidity of Automated Exchanges: New Evidence From Germany Bund Futures, vol. 8, Journal of International Financial Markets, Institutions and Money, pp. 225-241 (1998).

Self-Regulatory Organization; Chicago Stock Exchange, Inc.; Order Approving Proposed Rule Change Creating The Chicago Match System (59 F.R. 63141) SEC Release No. 34-35030, 1994 SEC LEXIS 3863, Nov. 30, 1994.

A. Sarker et al., "Electronic Trading on Futures Exchanges," Current Issues in Economics and Finance, Federal Reserve Bank of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).

Self-Regulatory Organizations; Filing and Order Gracting Accelerated Approval of Proposed Rule Change by the Chicago Board Options Exchange, Inc., Relating to System Modifications to the Retail Automated Execution System, SEC Release No. 34-32879, 58 F.R. 49342, Sep. 22, 1993.

CBOE Regulatory Circular RG 91-71, Dec. 25, 1991.

Notice of Receipt of Plan Filed Pursuant to Section 11A(a)(3)(B) of the Securities Exchange Act of 1934, 1980 WL 29398, SEC Release No. 16519, Jan. 22, 1980.

New York Stock Exchange Constitution and Rules (Commerce Clearing House, Inc. New York Stock Exchange Guide) Jul. 15, 1965, pp. 2644-2645; 2682-2683.

R. Teweles et al., The Stock Market, Fifth Edition, John Wiley & Sons, 1987, pp. 176-181.

J. Meeker, The Work of the Stock Exchange, The Ronald Press Company 1923, pp. 108-109.

CBOE Information Circular IC91-15, Feb. 25, 1991.

SEC Notice, Release No. 34-51107, SR-CBOE-2004-75, Federal Register vol. 70, No. 23, dated Friday, Feb. 4, 2005, pp. 6051-6057.

PCX Plus *The Pacific Exchange*, PCX Plus Overview, Oct. 9, 2003, six pages.

The National Association of Securities Dealer, Inc. "NASD Notice to members" 00-65, Sep. 2000, 5 pages.

Special Study: Payment for Order Flow and Internalization in the Options Markets, www.sec.gov/new/studies/ordpay.htm, printed on Oct. 22, 2001, 39 pages.

Domowitz, Ian, "A taxonomy of automated trade execution systems", 12 Journal of Int'l Money and Finance, p. 607-631, dated 1993.

"smartRay.com Delivers Stock Quotes and Financial Information to Wireless Devices for Free!", PR Newswire, p. 2870, Dec. 16, 1999.

Glen, Jack D., "Trading and information systems in two emerging stock markets", East Asian Executive Reports, vol. 16 No. 12, pp. 8, 14, Dec. 15, 1994.

Michaels, Jenna, "NASD'S Global Fumble", All Street & Technology, vol. 9 No. 11, pp. 5762, Jul 1992.

"PHLX Files Rule Changes to Improve Handling Orders on Pace", Securities Week, p. 5, Jul. 17, 1989.

"NYSE Votes to Restrict Computerized Trading", San Jose Mercury News, Feb. 5, 1988.

SEC Notice, Release No. 34-47959, SR-CBOE-2002-05, Federal Register vol. 68, No. 110, dated Monday, Jun. 9, 2003, pp. 34441-34448.

Original Rule Filing and Amendment No. 1 to SR-CBOE-2002-05, Submitted to SEC on Jan. 16, 2002, 17 pages.

Amendment No. 2 to SR-CBOE-2002-05, Submitted to SEC on May 16, 2002, 21 pages.

Amendment No. 3 to SR-CBOE-2002-05, Submitted to SEC on Jan. 15, 2003, 69 pages.

Amendment No. 4 to SR-CBOE-2002-05, Submitted to SEC on Apr. 3, 2003, 71 pages.

Amendment No. 5 to SR-CBOE-2002-05, Submitted to SEC on May 15, 2003, 3 pages.

Amendment No. 6 to SR-CBOE-2002-05, Submitted to SEC on May 30, 2003, 28 pages.

SEC Notice, Release No. 34-39086, SR-PCX-97-18, Federal Register vol. 62, No. 185, dated Wednesday, Sep. 24, 1997, pp. 50036-50048.

Angel, James J., "How Best to Supply Liquidity to a Small-Capitalization Securities Market", Georgetown University, Jul. 15, 1996, 27 pages.

Co-Pending U.S. Appl. No. 60/986,727, filed Nov. 9, 2007.

Raithel, Tom, article titled "Major Changes Seen for Exchanges", *Evansville Courier and Press*, Apr. 12, 2000, p. B.6.

Demeterfi, Kresimir, et al., "More Than You Ever Wanted to Know About Volatility Swaps," Goldman Sachs Quantitative Strategies Research Notes, Mar. 1999.

CBOE Futures Exchange letter dated May 17, 2004, to Commodity Futures Trading Commission with accompanying pages containing rules, terms, and conditions for a new product to be traded on the CBOE Futures Exchange, 8 pages.

Press Release article, "CBOE Announces Launch of Futures on VIX: First Tradable Volatility Product Will be Offered on New CBOE Futures Exchange," Sep. 5, 2003, two pages.

Sulima, Cheryl, "Volatility and Variance Swaps", *Capital Markets News*, Federal Reserve Bank of Chicago, Mar. 2001.

Transitions 1-3, *Transitions Trading* website, retrieved using: www.archive.org Jul. 29, 2004 and Dec. 11, 2004.

Bounds for a Volume Weighted Average Price Option, *A. W. Stace*, Sep. 24, 2004.

Hull, J. and White, A., "The Valuation of Credit Default Swap Options", *Journal of Derivatives*, vol. 10, No. 3, 2003, p. 40.

Duffie, D. and Huang, M., "Swap Rates and Credit Quality", Mar. 31, 1995.

Blahnik, Mike, "Internet Opens Up Trading Frontiers", Star Tribune, Metro Edition, Minneapolis, MN, Retrieved from: http://web.archive.org/web/20040322223904/http://www.intrade.com/, dated Jul. 25, 2004.

Bogomolny, Laura,: Wanna Make a Bet?, Canadian Business, Toronto, vol. 77, Iss. 21, Oct. 25 to Nov. 7, 2004.

Sodergreen, John, "Product profile: Economic Derivatives in the Energy Sector", *Futures Industry Magazine*, Jan.-Feb. 2005 issue, retrieved from http://www.futuresindustry/org/fi-magazine-home.asp?v=p&q=1018 on May 20, 2008.

Whaley, Robert. "Return and Risk of CBOE Buy Write Monthly Index", *The Journal of Derivatives*, 2002, pp. 35-42.

Chicago Board of Options Exchange, Inc. Description of the CBOE S & P 500 BuyWrite Index (BXM$^{sm}$), 5 pages, 2004.

Morgan Stanley, "Global Medium-Term Notes, series F", *Registration statement No. 333-117752*, Securities Commission and Exchange, 2004, pp. 22-26.

Chicago Board of Options Exchange, Inc. The New CBOE Volatility Index, 19 pages, 2003.

Vasiliki D. Skintzi, "Implied correlation index: A new measure of diversification", The Journal of Future Markets, Feb. 2005, vol. 25, Iss. 2, pp. 1-3.

U.S. Appl. No. 11/849,835, filed Sep. 4, 2007, entitled "System and Method for Creating and Trading a Derivative Investment Instrument Over a Range of Index Values", Applicant: O'Connell et al.

U.S. Appl. No. 12/112,605, filed Apr. 30, 2008, entitled "System and Method for Creating and Trading a Derivative Investment Instrument Over a Range of Index Values", Applicant: O'Connell et al.

U.S. Appl. No. 12/267,013, filed Nov. 7, 2008, entitled "Method and System for Creating a Volatility Benchmark Index", Applicant: Catherine T. Shalen.

Devore, Jay L., "Probability and Statistics for Engineering and the Sciences, Second Edition", Published 1987 by Wadsworth, Inc., pp. 13-16 and 88-96.

SEC Notice, Release No. 34-46803, SR-PCX-2002-36, Federal Register vol. 67 No. 222, dated Monday, Nov. 18, 2002, pp. 69580-69592.

SEC Notice, Release No. 34-47676, SR-CBOE-2002-05, Federal Register vol. 68 Nol. 77, dated Tuesday, Apr. 22, 2003, pp. 19865-19874.

Nimalendran et al., "Do Thinly Traded Stocks Benefit From Specialist Intervention", Jul. 15, 2002, http://papers.ssm.com/sol3/papers.cfm?abstract_id=319283.

"Pacific Exchange Launches PCX Plus on Schedule", Publication: PR Newswire, Publish Date: Oct. 6, 2003 (1 page).

Office Action issued in U.S. Appl. No. 12/267,035, dated May 11, 2011 (18 pages).

Office Action issued in U.S. Appl. No. 12/267,035, dated Dec. 12, 2011 (19 pages).

Elind Computers Private LMTD, "Online Global Trading System for Marketplaces" brochure, 2002 (15 pages).

C. Danis, et al. "Alternatives to an Open Outcry Market: An Issue of Supporting Cooperation in a Competitive Situation", IBM TJ Watson Research Center, USA, Believed to be publicly available prior to Apr. 24, 2003 (20 pages).

"The Electronic Component", The Options Institute Online Learning Center, obtained at the internet address: http://www.cboe.com/LearnCenter/cboeeducation/Course_02_02/mod_02_03.html, Believed to be publicly available prior to Apr. 24, 2003 (8 pages).

Joint Industry Plan: Order Approving Options Intermarket Linkage Plan Submitted by the American Stock Exchange LLC, Chicago Board Options Exchange, Inc., and International Securities Exchange LLC, U.S. Securities and Exchange Commission, dated Jul. 28, 2000 (26 pages).

* cited by examiner

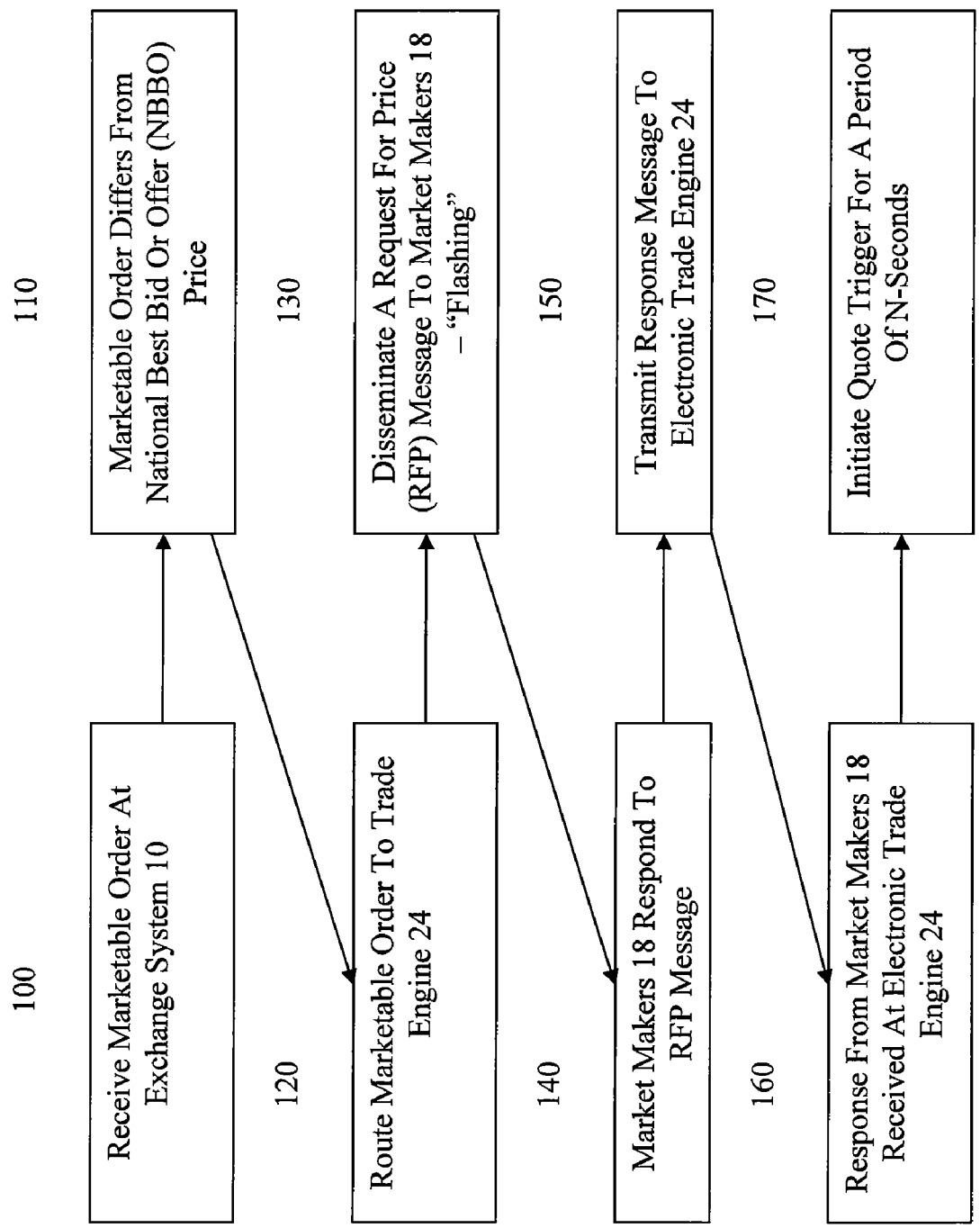

AUTOMATED TRADING SYSTEM FOR ROUTING AND MATCHING ORDERS

CROSS REFERENCE TO RELATED APPLICATIONS

This application claims the benefit of U.S. Provisional Application No. 61/107,861, filed Oct. 23, 2008, and is a continuation-in-part of U.S. application Ser. No. 11/321,065, filed Dec. 29, 2005, now U.S. Pat. No. 7,653,588, which is a continuation-in-part of U.S. application Ser. No. 10/423,201, filed Apr. 24, 2003, now U.S. Pat. No. 7,613,650, and the entirety of each of the aforementioned applications is incorporated herein by reference.

TECHNICAL FIELD

The present disclosure relates to the trading of securities or derivatives, such as options or futures. More particularly, the present disclosure relates to an automated exchange trading system and method for routing and matching orders.

BACKGROUND

The introduction of electronic trading mechanisms into exchanges for securities and derivatives has been an ongoing process. The desire for immediacy of order execution and dissemination of information is one reason for the steady substitution to electronic mechanisms. As trading volume continues to grow, along with the accompanying need for an increasingly efficient trading environment, the move toward electronic trading mechanisms is favored.

Electronic exchanges, while efficient and nearly instantaneous, do not necessarily provide for the routing of orders to a trade engine for a "flash" to the virtual crowd (an electronic, non-floor-based crowd) instead of routing to an away exchange with a more attractive market. A flash period is an auction period prior to the order linking away to another exchange. It is desirable for an exchange to provide a mechanism for the routing of orders to a trade engine for a "flash" to the virtual crowd instead of routing to a public automated routing (PAR) system for booking or automatically linking to an away market.

Currently, national best bid or offer (NBBO) rejects, certain "tweeners" and orders that are marketable against away markets route to PAR. Once on PAR, the orders are represented to the open outcry crowd and, if not traded by the crowd, are either routed to the book ("tweeners") or to an away market. Since manual handling is required on a floor of an exchange for these orders and multiple orders may arrive at a single floor-based workstation, there can be delays between the time the order arrives on the floor-based workstation (e.g. public automated routing workstation (PAR)) and the time the order is routed, booked or sent away for linkage to an away market. During the time period when an order rests on PAR, there is risk to both the customer and the PAR broker.

BRIEF SUMMARY

In order to address the drawbacks of both traditional open outcry exchanges and electronic exchanges as they pertain to the trading of national best bid or offer (NBBO) rejects, certain "tweeners" and orders that are marketable against away markets, an automated trading platform and method is disclosed herein routing and matching orders from a virtual trading crowd in an exchange prior to booking the order or automatically linking the order to an away market.

According to a first aspect of the disclosure, an automated system for matching orders from a virtual trading crowd in an exchange configured for trading securities or derivatives is disclosed including an electronic trade engine operative to receive at least one of an order or a quote for a security or derivative at the exchange, the trade engine further operative to disseminate a request for a price message to a plurality of market makers quoting a class in response to receiving the order or quote, an electronic book in communication with the electronic trade engine, the electronic book operative to store at least one order or quote received by the electronic trade engine, a database including an allocation algorithm, the database in communication with the electronic trade engine, and a trade processor in communication with the database, the trade processor operative to allocate orders or quotes according to the allocation algorithm selected from the database.

According to a second aspect of the disclosure, a method for matching orders or quotes to a virtual trading crowd in an exchange prior to automatically linking the order to an away market is disclosed, the method including, receiving an order or quote for a security or derivative at the exchange, wherein the exchange comprises a price for the security or derivative that differs from a national best bid or offer price, routing the order or quote to a trade engine, disseminating a request for price message to a plurality of market makers quoting a class, receiving at least one response message at the electronic trade engine, initiating a quote trigger, wherein the quote trigger occurs for a period of N seconds, and allocating at least a portion of the order or quote to at least one market maker according to an allocation algorithm, and allocating a remaining portion of the order or quote, if any, to at least one predetermined market maker guarantor to execute the remaining portion of the order or quote at the national best bid or offer price.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

FIG. 3 is a flow diagram of one embodiment of a method for providing order routing to a virtual crowd in an automated trading system.

DETAILED DESCRIPTION OF THE DRAWINGS

A system and method for trading securities, such as securities options is described herein. The trading mechanisms and rules described are based on providing incentives or limitations to particular classes of individuals or entities who are involved in trading at an exchange. For purposes of this specification, the following definitions will be used:

Broker/dealer—person or entity registered to trade for itself and/or on behalf of others at the exchange.

Public customer—person or entity, who is not a broker/dealer, trading on their own behalf through a broker/dealer or firm registered to trade at the exchange.

Firm—entity employing persons who represent the firm, or the firm's customers, on the exchange, such as market makers, floor brokers, broker/dealers, or other industry professionals.

Market maker—professional trader registered to trade at the exchange who is required to provide liquidity to a market, for example through streaming quotes for both a bid and an offer at a particular price.

Designated primary market maker (DPM)—market maker designated by the exchange to be responsible for a fair and orderly market, and to provide continuous quotes, for a particular class of options.

Virtual crowd—an electronic, non-floor-based crowd.

In-crowd market maker (ICM)—a market maker physically present on the floor of an exchange.

Non-ICM—any market participant other than an ICM.

Remote market maker (RMM)—a market maker not physically present on the floor of an exchange.

Market participant—any person or entity that can submit orders or quotes to an exchange.

Class of options—all series of options related to a given underlying security, where the underlying security may be, for example, publicly traded stock of a company.

Tweener—Order on a trading system that is represented to the open outcry crowd and, if not traded by the crowd, which is routed to the book.

Figure 1:
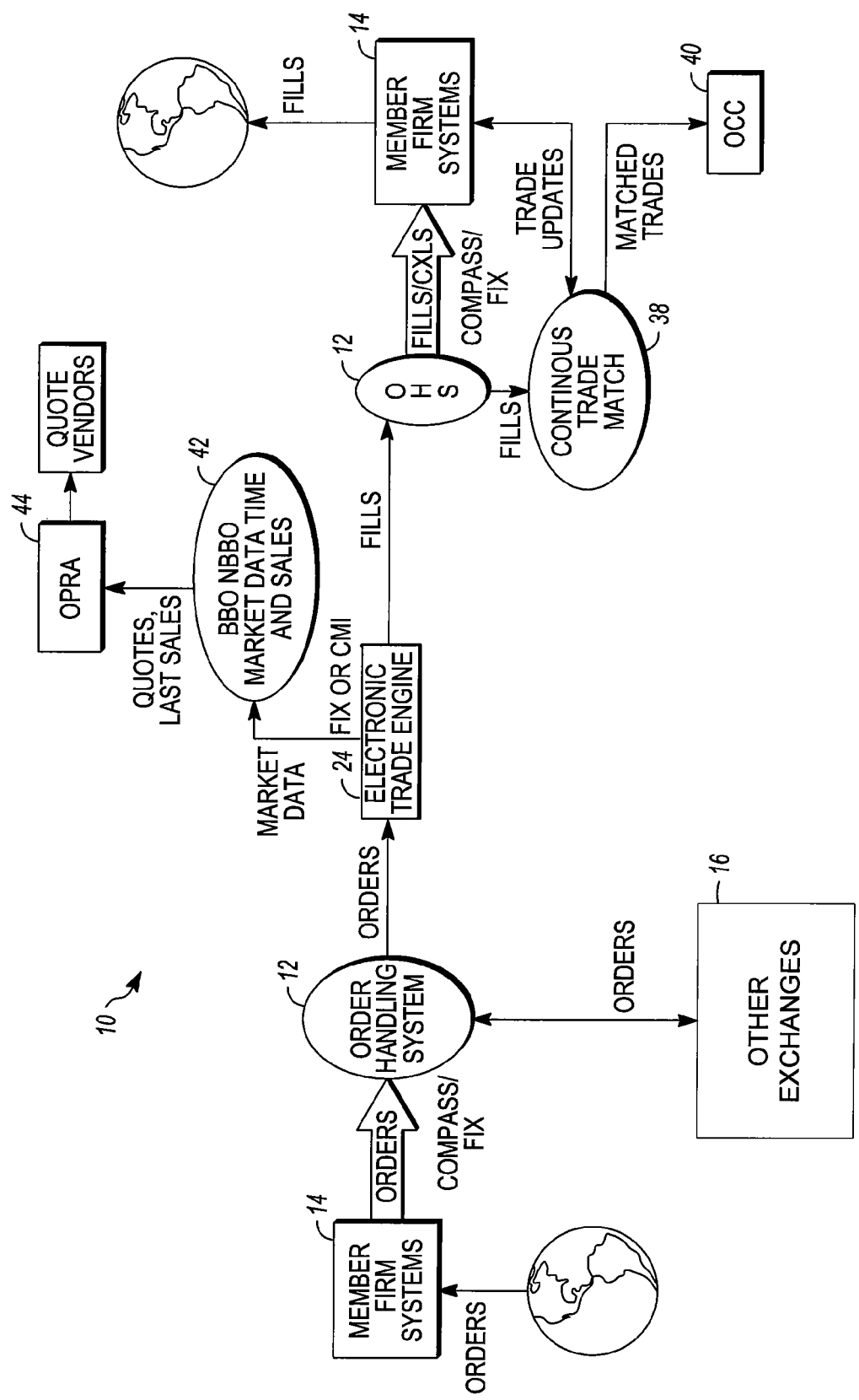
FIG. 1 is a diagram of one embodiment of an automated exchange system.

Referring to FIG. 1, one embodiment of an exchange system combining aspects of electronic, screen-based trading with traditional, open-outcry trading suitable for implementing various securities and derivatives trading methods described herein is illustrated. The exchange system 10 receives order information for the purchase or sale of securities, for example derivatives such as stock options, from numerous sources at a central order handling system (OHS) 12. OHS 12 may be any of a number of data processing systems or platforms capable of managing multiple transactions, as are well known in the art. For example, in one embodiment, the order routing system can be implemented on a transaction processing facility (TPF) platform manufactured by IBM Corporation. For purposes of clarity, the examples herein will refer specifically to options. However, it will be appreciated that the system and methods disclosed herein might be applied to the trading of other types of securities and derivatives.

Accordingly, an exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Information, such as orders may be entered into the OHS 12 from remote member firm systems 14 (including remote market makers 18) and/or other exchange systems 16. The member firm systems 14 and other exchange systems 16 may be located remotely from the geographical location of the exchange and use any of a number of standard landline or wireless communication networks to direct orders electronically to the OHS 12. The member firm systems 14 and other exchange systems 16 communicate with one of several interfaces or protocols for transmitting their orders to the OHS 12. Examples of suitable interfaces are those using a distributed object interface based on the Common Object Request Broker Architecture (CORBA) standard and available from the Object Management Group. Interfaces such as financial information exchange (FIX), which is a message-based protocol implemented over TCP/IP available from FIX Protocol, Ltd., or other known securities transaction communication protocols are also suitable protocols. Potential destinations for these orders are the OHS 12 or the electronic trade engine 24 in communication with the OHS 12.

When a trade is completed, such as a trade that is automatically executed through the electronic trade engine 24, the fill information is sent through the electronic trade engine 24 and OHS 12. OHS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange system 10 and format the information for submission to a quote dissemination service such as the Options Price Reporting Authority (OPRA) 44.

Figure 2:
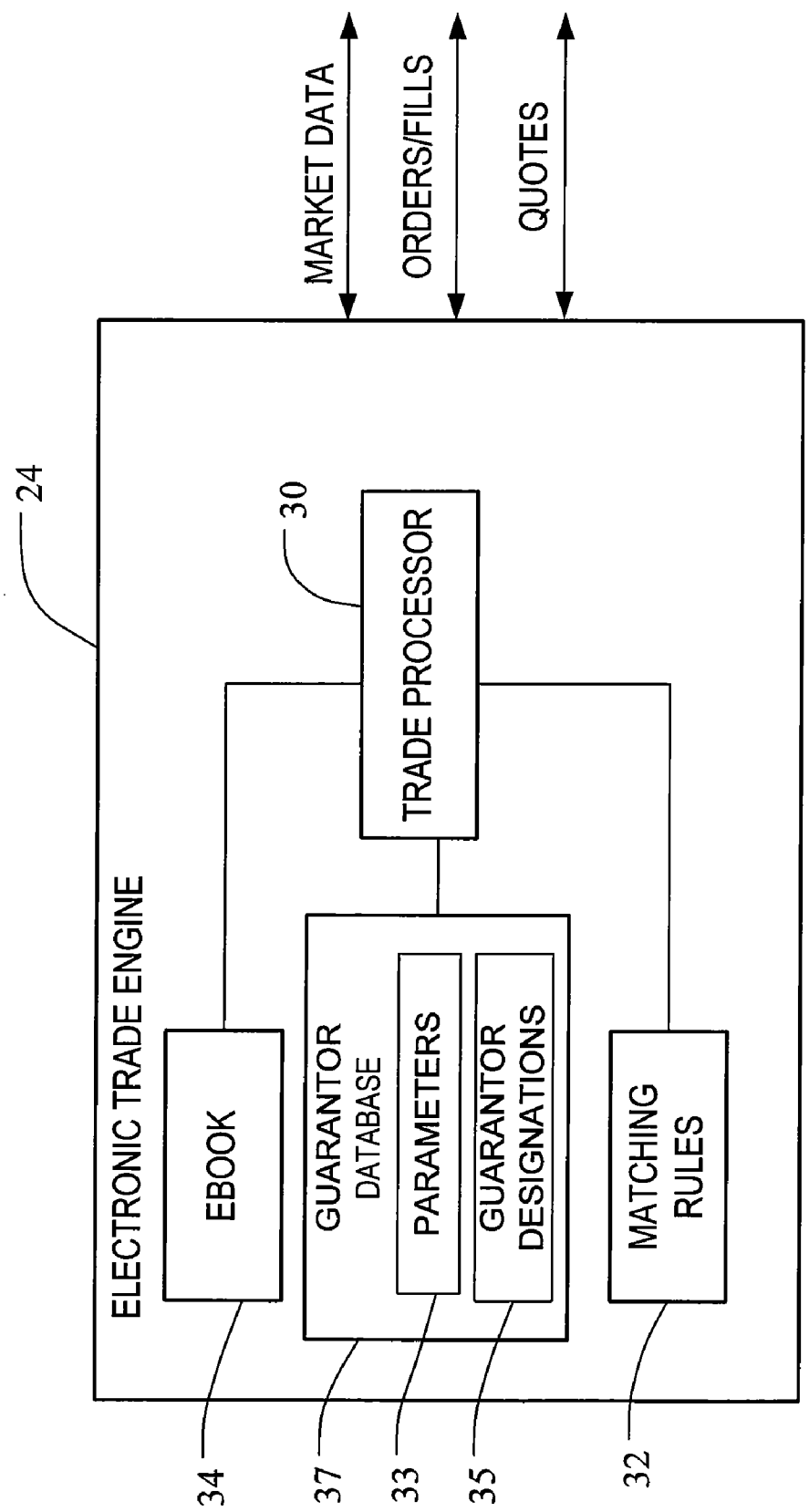
FIG. 2 is a block diagram of one embodiment of the electronic trading engine of FIG. 1.

As illustrated in FIG. 2, an electronic trade engine 24 comprises a trade processor 30 that analyzes and manipulates orders according to matching rules 32 stored in the database in communication with the trade processor 30, as described in copending U.S. patent application Ser. No. 10/423,201, the entirety of which is hereby incorporated by reference. Also included in the electronic trade engine is the electronic book (EBOOK) 34 of orders and quotes with which incoming orders to buy or sell are matched with quotes and orders resting on the EBOOK 34 according to the matching rules 32. In an embodiment, upon a match, the electronic trade engine 24 will mark the matched order or quote with the broker-specific identifier so that the broker sending the order or quote information can be identified. The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is automatically executed through the electronic trade engine 24, the fill information is sent through the electronic trade engine 24 and OHS 12. OHS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange system 10 and format the information for submission to a quote dissemination service such as the Options Price Reporting Authority (OPRA) 44.

The exchange system 10 may be configured to incorporate quote trigger functionality to permit greater participation in trades. The quote trigger would automatically be invoked when a new better price is entered so that additional market participants may have a limited time in which to enter quotes at a price matching the new better price and obtain a portion of the order. For example, upon detecting a quote from a market participant at a new best price which would match against an order on the electronic book from a non-ICM, the electronic trade engine 24 will remove the quantity of the resting order that would be tradeable against the incoming quote and hold it and the incoming quote for a predetermined period of time. Any desired preset hold period may be used, however in one embodiment it is contemplated that a five second hold period is used. In other embodiments, the hold period may be fixed anywhere in the range of 0.5-5.0 seconds. After removing the quantity of the resting order, the electronic trade engine 24 will treat the removed quantity of resting order as having been sold and disseminate a last sale market data message so that the OPRA system 44 will indicate the trade has taken place. The electronic trade engine 24 will update the top-of-the-market (i.e. update the quote) as though the trade had immediately occurred.

During the hold period, any other quotes or orders from market participants that would also be marketable against the original resting order are gathered and the resting order volume at the current best price will be further reduced, if any still remains in the book. At the expiration of the hold period, the accumulated in-crowd market participant quotes and orders are traded against the resting orders. If the size of the resting order was greater than the size of the sum of the market participant quotes and orders, each of the quotes and orders would execute fully against the resting order. If the size of the resting order is less than the sum of the market participant quotes and orders, the resting order is allocated among the quotes and orders according to the matching algorithms discussed above. The electronic trade engine will then send fill reports of the executed trades to the OHS 12 for distribution to the appropriate source of the quotes or orders involved.

NBBO Rejects

If an incoming order is marketable, but the exchange is not the NBBO, the OHS 12 will utilize routing parameters that permit NBBO reject orders to route to the electronic trade engine 24 on a class and origin basis. NBBO reject orders that are routed to the electronic trade engine 24 will be handled as described below.

Referring now to FIG. 3, a method of providing orders to a virtual trading crowd in an exchange prior to automatically linking the order to an away market is illustrated. As shown, a marketable order (an order that is marketable at an away market) for a security or derivative is received at the exchange system 10 (step 100), the exchange system 10 having a price for the security or derivative that differs from a national best bid or offer price. The marketable order is routed to the trade engine 24 (step 120), where a Request for Price ("RFP") message is disseminated ("flashing," as detailed below) to a plurality of remote market makers 18 quoting a class (step 130), which as detailed below, can include information such as the starting (and trading) price, as well as the side and size of the order. At least one of the remote market makers 18 responds to the RFP message (step 140) and transmits a response message to the electronic trade engine 24 (step 150). The response message, which is a message indicating the remote market makers' 18 response to the RFP message, is received at the electronic trade engine 24 (step 160), and a quote trigger is initiated, with the quote trigger occurring for a period of N seconds (step 170).

In accordance with an embodiment, any existing quote locks, quote triggers or auctions for quotes and offers at the NBBO will end and will be allocated prior to the start of any "flashing" of NBBO reject orders to market makers quoting in the class. In one embodiment, "flashing" is accomplished by transmitting a Request for Price ("RFP") to the market makers quoting in the class. The system 10 may retain a record of all market makers quoting at the best price as well as the firm quote obligation when the RFP is sent. This is referred to as the "flash" phase. In one embodiment, the RFP includes the NBBO price as the starting (and trading) price, as well as the side and size of the order. The flash phase will last for a period of N second(s), where N may be a fixed or variable time period, or until the first RFP response is received, whichever is shorter. Typically, the flash phase period is the same for any flash type described herein. In one embodiment, the N-second period is less than 5 seconds. In other embodiments, it is contemplated that each flash type (e.g. NBBO reject, Tweener, etc.) may be assigned a different time period. In yet other embodiments, the time period may be variable based on the current number of market makers in the quoting class, the number of contracts involved or other instantaneous or historical statistic relating to the class of options being traded.

Unlike other RFPs, the NBBO price is not a starting price for an auction. Instead, the NBBO is typically the price that the order will be traded at even if a quote moves to a better price or an RFP response is received at a better price. Essentially, the order is treated as though it has been booked at the NBBO price. As with other RFP responses, these will not be displayed as part of the disseminated quote. Once the first response is received from a market maker at the appropriate price (either a quote, or an ICM order, also referred to as an I-order or an RFP response) the second phase (the "trigger" phase) will be started. During the trigger phase, a quote trigger will last for N seconds. In one embodiment, a last sale price will be disseminated immediately. Quotes, I-orders and RFP responses may be included in the quote trigger group.

In one embodiment, the order will be allocated using a matching algorithm, referred to herein as the Capped Ultimate Matching Algorithm (CUMA). In CUMA, the allocation algorithm will typically be configurable by class and/or by auction-type. For example, matching algorithms can be used to allocate an incoming order to participants based on the number of participants and the order size each participant represents. Furthermore, orders are preferably allocated to the multiple market participants quoting at the same price based on two components: an 'A' component, or parity factor, and a 'B' component, or pro rata/depth of liquidity factor. The parity factor of the matching algorithm treats as equal all market participants quoting at the relevant best bid or offer at the exchange (BBO). Thus, if there were four market participants quoting or bidding at the best price, each would be assigned 25 percent for the parity component of the matching algorithm. Viewed in conjunction with the pro rata factor of the algorithm, the parity component of the algorithm provides incentive to market participants to quote at a better price than their competitors even though they may have a smaller quote size than other market participants quoting at the BBO.

The second component of CUMA rewards those quoting larger sizes at the best price by providing the market participants a pro rata component based on the percentage of the volume of that market participant's quote size with reference to the sum of the total of all quote sizes at the best price, with the added feature that certain participants are limited in the size of their order that will be used to calculate the 'B' component of the equation. For example, if the disseminated quote represents the quotes of market makers x, y, and z who quote for 20, 30, and 50 contracts respectively, then the percentages assigned under the pro rata component are 20% for x, 30% for y, and 50% for z. The final allocation may then be determined by multiplying the average of the A and B components by the size of the incoming order available. In one embodiment, the matching algorithm described above produces the following equation:

$$\text{Participant's allocation} = \text{incoming order size} \times \left[ \frac{\frac{1}{\text{number of participants}} + \frac{\text{participant quote size}}{\sum \text{participant quote sizes}}}{2} \right]$$

Thus, for example, where certain participants are limited in the size of their order that will be used to calculate the 'B' component of the equation, participants such as in-crowd market makers (ICMs) may be capped in this way so that, after other participants have already entered their order or quotes, the ICM cannot inflate the size of its order to obtain a greater pro rata weighting (and thus greater allocation) of the available order.

Additionally, all responses (including quotes, I-orders and RFP responses) from a single market maker will typically be aggregated for the purposes of calculating the 'A' component of CUMA. A participation filter may be used by the trading engine to determine which market participants can or cannot participate in the quote trigger. For example, the electronic trade engine may be configured to permit all non-customers to participate in the quote trigger process by recognizing a participant identifier associated with non-customers. In other implementations the electronic trade engine may be programmed to only allow ICMs to participate in a quote trigger.

If non-customers were included in the quote trigger process based on this filtering mechanism, an incoming order under the 'B' component could start the quote trigger after the RFP period is started. Additionally, an incoming 'B' component of the order would participate in the quote trigger, rather than trading at the next price. It is anticipated that customers will continue to trade as they do today.

In another embodiment, the order will be allocated using another matching algorithm, referred to herein as the Maker-Taker Algorithm. Under the Maker-Taker Algorithm, all trades are divided into two types of orders: price setter and price taker. Traders who want to buy or sell at a given price place a price setter order, and traders who want to interact with the bid or offer place a price taker order. Often, the price setters receive a rebate when their orders are executed, while the price takers are charged for order execution. There is no customer priority of orders in connection with this algorithm.

Once the flash phase begins, if a marketable customer order is received that could trade against the flashed order, the orders will trade against each other immediately with any balance routing to the appropriate destination. If a customer order is received during the trigger phase, it may trade at the next available price or route to the appropriate destination.

If the away market moves during the flash phase and the exchange becomes the NBBO, the flash phase will end and the order will be automatically traded and allocated to the market makers on the quote. If an away market moves to a better price during the flash phase, the flash phase will end and the order will route for auto-linking to an away exchange. Since market makers may have a firm quote obligation during the N-second flash phase, if the exchange market makers move quotes such that there is no longer enough size to fill the incoming order up to the original disseminated size, the order will be routed to an away exchange immediately using auto-link functionality.

If the flash phase ends and there are no responses, the order will automatically link away from the exchange to another exchange. In the unlikely circumstance that the order cannot be routed away once it is received due to either: (1) a lack of an away market at a better price, or (2) the OHS 12 rejects that order because the away market is no longer available after the system 10 attempts to send the linkage order, the system 10 will automatically route the order back to the electronic trade engine 24 where it will be filled at the original firm quote price up to the original firm quote size.

In one embodiment, the order may be filled in one of the following ways:

If there are market makers on the market that can fulfill the firm quote obligation (the original price and size or better) the order will be assigned to them. Alternatively, if there is more size required to fulfill the firm quote obligation, the order will be assigned to those quoters who comprised the firm quote at the time the order was received. Since the electronic trade engine 24 will have to keep track of the participants that were on the original market, it is contemplated that an additional mechanism may be required so that the electronic trade engine 24 does not have to store the information indefinitely.

In one embodiment, a market maker guarantor may be designated to fill orders not fully executed (and therefore have a remaining portion). Such a designated market maker guarantor assures that there will be an NBBO execution for the remaining portion of orders from a submitting firm that are not fully executed after the exposure and allocation periods have concluded (detailed above). There may be one or more predetermined market maker guarantors and each market maker guarantor may set parameters 33 on their execution guarantees including but not limited to order size, price, size of a displayed national best bid or offer, which exchanges are displaying the national best bid or offer, transaction costs, and a number of increments from an exchange best bid or offer. Market maker guarantors may set only one or any combination of these parameters 33, which parameters 33 may then be stored in a database of the exchange system 10. The market maker guarantor designations 35, i.e. the market makers designated as guarantors, and the parameters 33 set by the market maker guarantors may both be stored in a guarantor database 37 in communication with the trade processor 30, as detailed herein above, so that the trade processor 30, in communication with both the rules database 32 and the guarantor database 37, can be operative to analyze and execute orders according to the allocation algorithm selected from the rules database 32 and allocate a remaining portion of the order, if any, to at least one predetermined market maker guarantor selected from the guarantor database 37 to execute the remaining portion of the order at the national best bid or offer price.

Preferably, the remaining portion of the order is automatically allocated to the market maker guarantor if the remaining portion meets the parameters 33 set by the market maker guarantor. A notification may be sent by the exchange system 10 to the market maker guarantor upon the automatic allocation of the remaining portion of the order. It is also contemplated that, in the event that the remaining portion of the order exceeds the order size that a market maker guarantor is willing to guarantee, the remaining portion of the order may be divided among more than one market maker guarantor so that the entire remaining portion may be executed at the NBBO. Alternatively, it may be desired that, if the remaining portion of the order exceeds the order size that a market maker guarantor is willing to guarantee, the remaining portion is not executed against the market maker guarantor.

"Tweener" Locks

An incoming order that is between the market at the exchange, but is marketable against an away market, is commonly referred to as a "tweener lock." The "tweener lock" order cannot be booked because it would lock or cross an away market. In one embodiment, the OHS 12 comprises routing parameters to allow tweener locks to route to the electronic trade engine 24 based on class and origin. Orders that are routed to the electronic trade engine 24 will typically be handled as described above for NBBO rejects, with the exception that there is no firm quote obligation. Thus, the requirements of the firm quote will typically not be followed. If there are no responses during the flash phase, the order will be automatically linked away. If the order cannot be linked away, it will automatically route back to the electronic trade engine 24 for booking.

"Tweeners"

An incoming order that is between the market at the exchange and does not lock or cross an away market is commonly referred to as a "tweener." In one embodiment, the OHS 12 comprises parameters used to route tweeners to the electronic trade engine 24 based on class and origin code. Orders that are routed to the electronic trade engine 24 will be handled as described above for NBBO rejects, with the exception that there is no firm quote obligation. Thus, the requirements of the firm quote will not be followed. If there are no responses during the flash phase, the order will typically be booked automatically.

Although the system and methods described herein relate to an exclusively electronic, screen-based exchange that does not include floor based, open-outcry trading, many of the procedures described may be applied to a system incorporating and involving active participation from a trading floor and a screen-based electronic trading crowd. As will be appreciated by those of ordinary skill in the art, mechanisms for providing orders to a virtual trading crowd in an exchange prior to booking the order or automatically linking the order to an away market and other features described above may all be modified for application to other forms of trading within the purview and scope of the present invention. An advantage of the disclosed system and methods is that more traders at the exchange may have more opportunity to see and compete for orders that are NBBO rejects, tweener locks or tweeners, thus increasing visibility of orders and the desirability of maintaining a presence at the exchange.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A computer implemented method of allocating orders for the purchase or sale of securities or derivatives in an exchange configured for trading securities or derivatives, the method comprising:

receiving an electronic order for a security or derivative at an electronic trade engine in a server of the exchange while the exchange is currently at a price for the security or derivative that is different than a national best bid or offer price such that the received order is marketable against an away market;

in response to receiving the electronic order, a trade processor in the trade engine at the exchange flashing the electronic order to a plurality of eligible market participants, wherein the plurality of eligible market participants is less than a total number of market participants in communication with the electronic trade engine;

routing the electronic order in its entirety to an away market in absence of the trade processor receiving a price from at least one eligible market participant for the electronic order that is equal to or better than the national best bid or offer price within a predetermined period of time after flashing the electronic order;

in response to receiving an improved price from at least one of the plurality of eligible market participants within the predetermined time period after flashing the electronic order, wherein the improved price is equal to or better than the national best bid or offer price, the trade processor:

matching and allocating a portion of the electronic order at the improved price against each of the eligible market participants from whom the improved price was received, wherein the improved price is not included as part of a disseminated quote at the exchange; and routing a remaining portion of the electronic order to an electronic book configured for storing orders received by the electronic trade engine, or to an away market, based on a price available at the exchange after matching and allocating the portion.

2. The method of claim 1, wherein the trade processor flashing the electronic order comprises the trade processor transmitting a request for price message.

3. The method of claim 1, wherein the plurality of eligible market participants less than the total number of market participants comprises market makers quoting in a class associated with the securities or derivatives in the received electronic order.

4. The method of claim 2, wherein the request for price message comprises a price equal to the national best bid or offer price.

5. The method of claim 4, wherein the request for price message further comprises an order size.

6. The method of claim 1, wherein the trade processor matching and allocating the portion of the electronic order comprises the trade processor allocating the portion according to an allocation algorithm, wherein an order size of each eligible market participant at the improved price is capped to prevent inflation of an allocated portion of the order.

7. The method of claim 6, wherein the allocation algorithm comprises a participation component and a pro rata component for each eligible market participant at the improved price.

8. A computer implemented method of allocating orders for the purchase or sale of securities or derivatives in an exchange configured for trading securities or derivatives, the method comprising:

receiving an electronic order for a security or derivative at an electronic trade engine in a server of the exchange while the exchange is currently at a price for the security or derivative that differs from the national best bid or offer price, wherein the received order does not lock or cross an away market;

in response to receiving the electronic order, a trade processor in the trade engine at the exchange flashing the electronic order to a plurality of eligible market participants, wherein the plurality of eligible market participants is less than a total number of market participants in communication with the electronic trade engine;

storing the electronic order in an electronic book in absence of the trade processor receiving a price from at least one eligible market participant for the electronic order that is equal to or better than the national best bid or offer price within a predetermined period of time after flashing the electronic order; and in response to receiving an improved price from at least one of the plurality of eligible market participants within the predetermined time period, wherein the improved price is equal to or better than the national best bid or offer price, the trade processor:

matching and allocating a portion of the electronic order at the improved price against each of the eligible market participants from whom the improved price was received, wherein the improved price is not included as part of a disseminated quote at the exchange;

routing a remaining portion of the electronic order to an electronic book configured for storing orders received by the electronic trade engine, or to an away market, based on a price available at the exchange after matching and allocating the portion.

9. The method of claim 8, wherein the trade processor flashing the electronic order comprises the trade processor transmitting a request for price message.

10. The method of claim 8, wherein the plurality of eligible market participants less than the total number of market participants comprises market makers quoting in a class associated with the securities or derivatives in the received electronic order.

11. The method of claim 9, wherein the request for price message comprises a price equal to the national best bid or offer price.

12. The method of claim 8, wherein the trade processor matching and allocating the portion of the electronic order comprises the trade processor allocating the portion according to an allocation algorithm, wherein an order size of each eligible market participant at the improved price is capped to prevent inflation of an allocated portion of the order.

13. The method of claim 12, wherein the allocation algorithm comprises a participation component and a pro rata component for each eligible market participant at the improved price.

14. An automated exchange system for the purchase or sale of securities or derivatives in an exchange configured for trading securities or derivatives comprising:

an electronic trade engine comprising at least one server configured for receiving an electronic order for a security or derivative at an electronic trade engine of the exchange;

an electronic book configured for storing the incoming orders received by the electronic trade engine when the exchange price is equal to or better than the national best bid or offer price;

a database comprising an allocation algorithm, the database in communication with the electronic trade engine;

a trade processor in communication with the database and configured to, in response to a price at the exchange for the security or derivative being different than a national best bid or offer price upon receipt of the electronic order, such that received order is marketable against an away market, flash the electronic order to a plurality of eligible market participants, wherein the plurality of eligible market participants is less than a total number of market participants in communication with the electronic trade engine;

the trade processor further configured to:

route the electronic order in its entirety to an away market in absence of receiving a price from at least one eligible market participant for the electronic order that is equal to or better than the national best bid or offer price within a predetermined period of time after flashing the electronic order;

in response to receiving an improved price from at least one of the plurality of eligible market participants within the predetermined time period after flashing the electronic order, wherein the improved price is equal to or better than the national best bid or offer price:

match and allocate a portion of the electronic order at the improved price against each of the eligible market participants from whom the improved price was received, wherein the improved price is not included as part of a disseminated quote at the exchange; and route a remaining portion of the electronic order to the electronic book or to an away market based on a price available at the exchange after matching and allocating the portion.

15. The automated exchange system of claim 14, wherein the trade processor is configured to transmit a request for price message in order to flash the electronic order.

16. The automated exchange system of claim 14, wherein the plurality of eligible market participants less than the total number of market participants comprises market makers quoting in a class associated with the securities or derivatives in the received electronic order.

17. The automated exchange system of claim 15, wherein the request for price message comprises a price equal to the national best bid or offer price.

18. The automated exchange system of claim 17, wherein the request for price message further comprises an order size.

19. The automated exchange system of claim 14, wherein the trade processor is configured to match and allocate the portion according to an allocation algorithm, and wherein the trade processor is configured to cap an order size of each eligible market participant at the improved price to prevent inflation of an allocated portion of the order.

20. The automated exchange system of claim 19, wherein the allocation algorithm comprises a participation component and a pro rata component for each eligible market participant at the improved price.

* * * * *